United States Patent
Dargnat et al.

(10) Patent No.: US 10,736,277 B2
(45) Date of Patent: Aug. 11, 2020

(54) CURVED DELIMBING BLADE, USE OF SAME, CORRESPONDING DELIMBING HEAD AND CUTTING KIT

(71) Applicant: ISI INTEGRATION & SOLUTIONS INDUSTRIELLES, Cournon d'auvergne (FR)

(72) Inventors: Guillaume Dargnat, Le Broc (FR); Celine Devemy, Tallende (FR); Henri-Pascal Pellet, Saint Martin d'uriage (FR); Jean-Christophe Fauroux, Mazayes (FR)

(*) Notice: Subject to any disclaimer, the term of this patent is extended or adjusted under 35 U.S.C. 154(b) by 0 days.

(21) Appl. No.: 15/309,888

(22) PCT Filed: May 11, 2015

(86) PCT No.: PCT/FR2015/051226
§ 371 (c)(1),
(2) Date: Nov. 9, 2016

(87) PCT Pub. No.: WO2015/177432
PCT Pub. Date: Nov. 26, 2015

(65) Prior Publication Data
US 2017/0164567 A1    Jun. 15, 2017

(30) Foreign Application Priority Data
May 19, 2014    (FR) ...................... 14 54476

(51) Int. Cl.
*A01G 23/083*    (2006.01)
*A01G 23/085*    (2006.01)
(Continued)

(52) U.S. Cl.
CPC ................ *A01G 23/095* (2013.01)

(58) Field of Classification Search
CPC .... A01G 23/08; A01G 23/083; A01G 23/091; A01G 23/093; A01G 23/095;
(Continued)

(56) References Cited

U.S. PATENT DOCUMENTS 3,183,949 A * 5/1965 Larson ................. A01G 23/083
                                                        144/24.13
3,596,690 A * 8/1971 Hamilton ............ A01G 23/097
                                                        144/24.13
(Continued)

FOREIGN PATENT DOCUMENTS

DE    102011108813 A1    1/2013
DE    202013000373    *    1/2013
DE    202013000373 U1    1/2013

OTHER PUBLICATIONS

Machine translation of Document (N) DE202013000373.*
(Continued)

*Primary Examiner* — Shelley M Self
*Assistant Examiner* — Smith Oberto Bapthelus (57) ABSTRACT

A curved blade for a delimbing head operable to cut branches from a felled tree is disclosed. The curved blade comprises a cutting rim, at least one portion of which comprises a continuous flange defining a continuous cutting edge, as well as at least one row of ribs that are straight and parallel to each other, extending in the direction of at least one face of the cutting rim from the continuous flange. The continuous cutting edge of the blade having these straight parallel ribs reduces the lateral load of the continuous cutting edge during the operation of cutting branches from a felled tree.

9 Claims, 7 Drawing Sheets

(51) Int. Cl.
*A01G 23/087* (2006.01)
*A01G 23/09* (2006.01)
*A01G 23/095* (2006.01)
*A01G 23/097* (2006.01)

(58) Field of Classification Search
CPC .............. A01G 23/0955; A01G 23/097; A01G 23/085; A01G 23/087; A01G 23/09; B27L 1/08; B27L 1/10
USPC ...................................................... 144/24.13
See application file for complete search history.

(56) References Cited

U.S. PATENT DOCUMENTS

| | | | | | |
|---|---|---|---|---|---|
| 3,718,167 | A | * | 2/1973 | Cervenak | A01G 23/097 144/208.8 |
| 3,809,134 | A | * | 5/1974 | McCabe | A01G 23/097 144/24.13 |
| 3,981,336 | A | * | 9/1976 | Levesque | A01G 23/083 144/4.1 |
| 3,999,582 | A | * | 12/1976 | Allen | A01G 23/083 144/339 |
| 4,004,622 | A | * | 1/1977 | Hamilton | A01G 23/083 144/24.13 |
| 4,050,486 | A | * | 9/1977 | Whitcomb | A01G 23/095 144/24.13 |
| 4,094,348 | A | * | 6/1978 | Wolf | A01G 23/06 144/34.1 |
| 4,194,542 | A | * | 3/1980 | Eriksson | A01G 23/097 144/208.8 |
| 4,258,763 | A | * | 3/1981 | Figueredo | A01G 23/091 125/18 |
| 4,369,824 | A | * | 1/1983 | Dressler | A01G 23/095 144/24.07 |
| 4,606,385 | A | * | 8/1986 | Williamson | A01G 23/097 144/24.13 |
| 5,887,635 | A | * | 3/1999 | Hamby, Jr. | A01G 23/097 144/24.13 |
| 6,070,627 | A | * | 6/2000 | Hamby, Jr. | A01G 23/095 144/24.13 |
| 6,488,063 | B2 | * | 12/2002 | Seymour | A01G 23/095 144/24.13 |
| 6,729,372 | B1 | * | 5/2004 | Koster | A01G 23/095 144/24.13 |
| 7,273,078 | B2 | * | 9/2007 | Shae | A01G 23/097 144/208.2 |
| 7,377,297 | B2 | * | 5/2008 | Shae | A01G 23/097 144/24.13 |
| 7,487,809 | B2 | * | 2/2009 | Uebergang | A01G 23/0955 144/208.1 |
| 2006/0157156 | A1 | * | 7/2006 | Shae | A01G 23/097 144/208.1 |
| 2015/0144225 | A1 | * | 5/2015 | Stulen | B27L 1/005 144/208.91 |
| 2015/0375974 | A1 | * | 12/2015 | Kramer | B66C 23/78 144/24.13 |
| 2017/0164567 | A1 | * | 6/2017 | Dargnat | A01G 23/095 |
| 2017/0273238 | A1 | * | 9/2017 | Penner | A01D 34/015 |

OTHER PUBLICATIONS https://www.google.com/search?ei=oJ9UXKLWFOTs_Qai86rQBA&q=rib+definition&oq=rib+defi&gs_l=psy-ab.1.0.0l7j0i22i30l3.6170.7170..9538...0.0..0.244.752.0j4j1......0....1..gws-wiz.......0i71j0i67j0i10.MrM37-vsCGM (retrieved on Feb. 1, 2019).*
Translation of Written Opinion for PCT/FR2015/051226, WO dated Jan. 2015.

* cited by examiner

CURVED DELIMBING BLADE, USE OF SAME, CORRESPONDING DELIMBING HEAD AND CUTTING KIT

CROSS-REFERENCE TO RELATED APPLICATIONS

The present application claims the benefit of international application number PCT/FR2015/051226, filed on May 11, 2015, which claims the benefit of French application no. 1454476, filed on May 19, 2014.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention concerns a delimbing curved blade, a use of this curved blade, a delimbing head provided with at least one such blade, as well as a cutting kit comprising at least one such blade.

The delimbing operation consists in cutting the branches of a tree, after having felled it. The trunk of the tree, thus stripped, may then be transported or sawn on-site. This operation is implemented by means of a specific machine, called a delimbing head. The curved blade of the invention is adapted to equip a head which may, either be fixed and delimb a moving tree, or be movable and delimb a stationary tree.

Brief Discussion of the Prior Art

Conventionally, as described for example in document FR 2 794 612, a delimbing head first comprises a body or frame. Different arms, allowing grabbing the trunk, are hinged on the frame by pivot linkages, about axes which are generally parallel to the longitudinal axis of the trunk. The head further comprises motorized drive means, such as wheels or rollers, allowing displacing the trunk along the body. The delimbing operation itself is carried out thanks to the presence of blades, which are carried by the grabbing arms.

When the trunk is set in motion along the head, thanks to the drive means, the blades allow cutting the branches, at the level of their junction with the trunk. This is called impact delimbing. These blades are called curved blades in the sense that they present a curvature when viewed from the front, that is to say, in a plane perpendicular to the axis of the trunk. Thus, these blades may conform to the peripheral face of the trunk, in service. Some blades, as the one described in document DE-A-10 2011 108813, are undulated with a toothed cutting edge. Such a configuration limits the planing phenomenon but remains complex to achieve.

However, the curved blades of the state of the art present some drawbacks, related in particular to their lack of effectiveness. Indeed, these blades are subjected to inadvertent jamming phenomena, when cutting the branches.

It is understood that these jams first decrease productivity on the site. Indeed, this requires the operator to carry out additional manipulations, in order to finish the delimbing operation. In addition, these jams are accompanied with a considerable cutting force, causing problems of mechanical strength of the parts, which may also induce a premature wear of the blade.

BRIEF SUMMARY OF THE INVENTION

Under these conditions, the invention aims to propose a curved blade, for a delimbing head, which allows overcoming the drawbacks of the prior art described hereinabove. It aims to propose such a blade, which confers enhanced effectiveness and productivity to the cutting operation. In particular, it aims to propose such a blade, which allows reducing the cutting forces for a given branch diameter, or which ensures cutting a branch with a larger diameter for a given push.

To this end, it relates to a curved blade for a delimbing head, intended to be mounted on an arm of this head, said blade comprising a cutting rim having an inner face, adjacent to the trunk of the tree, in service, and an outer face, this blade further presenting, when viewed from the front, a curvature over a substantial portion of its length, characterized in that at least one portion of the cutting rim comprises a continuous flange defining a continuous cutting edge, as well as at least one row of ribs, the longitudinal axes of which are straight and parallel to each other, extending in the direction of at least one face of the cutting rim, from this continuous flange.

The blade in accordance with the invention allows reducing the cutting forces, in comparison with a non-ribbed curved blade, as used in the prior art.

Indeed, according to the invention, the continuous edge is associated with ribs which serve to reduce the lateral load of this continuous edge. Hence, it is possible to size the flange, and therefore this edge, without any risk of breakage, so as the latter presents a reduced contact surface with the tree, which improves the cutting of the matter.

In addition, the blade in accordance with the invention may be adapted, simply and rapidly, on existing delimbing heads.

According to advantageous, but not mandatory, aspects of the invention, such a curved blade may comprise one or more of the following features:

- The ribs define free edges, or leading edges, which lie in the extension of the continuous cutting edge.
- The ribs define free edges, or leading edges, which are separated from the continuous cutting edge by means of a flat portion.
- There is provided a single row of ribs which extend in the direction of said outer face of the cutting rim.
- There are provided two rows of ribs extending in the direction, respectively, of the outer and inner faces of the cutting rim.

The continuous cutting edge and the free edge of each rib have identical chamfer angles, considered with respect to a main straight line of the inner face.

The ribs are flared opposite to the cutting rim, in a wedge-like manner

The cutting blade presents the same radius of curvature over its entire length.

The cutting blade has at least two sections presenting different radii of curvature.

The cutting blade is constituted of several straight sections, when viewed from the front.

The cutting blade is formed in a single-piece.

The cutting blade is constituted of several separate sections.

The cutting blade is made of several different materials.

The ribs present a constant width.

A portion of the blade, in particular its cutting rim, is hardened by means of a coating.

The ribs are made independently of the blade body, and then affixed on this body, for example by welding.

The cutting blade is fitted with at least one visual wear indicator.

The invention also relates to a use of a curved blade as disclosed hereinabove, for equipping a delimbing head.

The invention also relates to a delimbing head comprising a frame, several arms hinged on the frame, which are capable of grabbing a trunk of a tree, and curved blades fastened on the arms, suitable for cutting branches of the tree, at least one of these blades, preferably most of these blades and, still preferably, all these blades being as above.

Advantageously, at least one curved blade is composed of several sections removably fastened on the arm, each section being in particular deformed while being fastened on the arm. Alternatively, each section may be manufactured with the same curvature as the arm, and then mounted on the latter without deformation.

Advantageously, once these sections are fastened on the arm, two adjacent sections will have an overlapping area, when viewed from the front.

Finally, the invention relates to a cutting kit comprising at least two blades as above, at least one parameter being different between at least two blades, this parameter being selected in the group constituted by the length of the cutting rim, the dimensions of the continuous flange, the dimensions of the ribs, the nature of their constituent material.

The dimensions of the ribs also define their shape, as well as their spacing.

First, this kit allows adapting to different wood species in a satisfactory way. Depending on the treated wood species, a blade of this kit, which is appropriate to the considered wood, can be easily adapted on the delimbing head.

This kit may also be intended to a particular wood species, for example a kit called «chestnut» kit or a kit called «oak» kit. This kit then presents several blades, likely to be used appropriately in particular depending on the size of the branches to be cut.

BRIEF DESCRIPTION OF THE SEVERAL VIEWS OF THE DRAWING

The invention will be better understood and other advantages thereof will appear clearly upon reading the following description, given only as a non-limiting example and made with reference to the appended drawings, wherein.

DETAILED DESCRIPTION OF THE INVENTION

Figure 10:
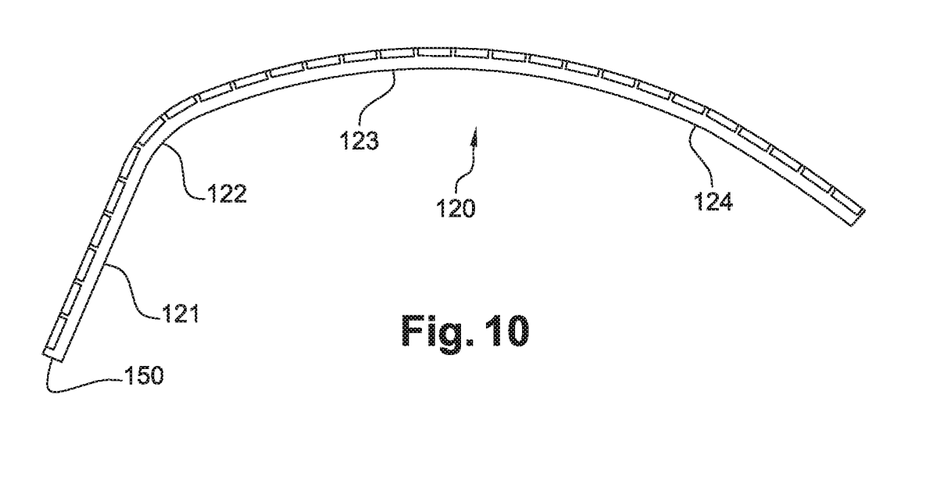
FIG. 10 is a front view, similar to FIG. 4, illustrating a blade in accordance with a variant of the invention.

In the present description, the mechanical elements of the main embodiment, illustrated with reference to FIGS. 1 to 9, carry the reference numerals 1 to 70. In FIG. 10 and in the following figures, which illustrate variants of the invention, the mechanical elements similar to those of FIGS. 1 to 9 carry the same reference numerals, increased respectively by 100, 200, 300, 400, 500, 600, 700 and 800.

Figure 1:
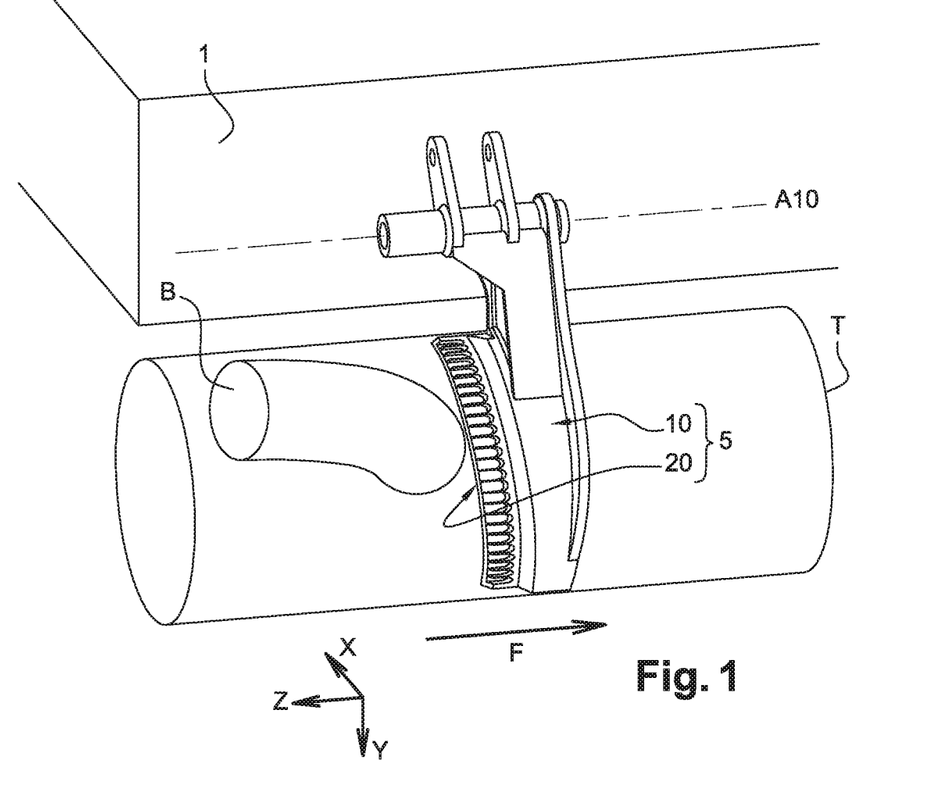
FIG. 1 is a perspective view of a curved knife positioned in a delimbing head in accordance with the invention.

FIG. 1 illustrates a delimbing head in accordance with the invention, which is for example positioned to hang freely, with the trunk it supports, at the end of a gimbal which is not represented. In the present description, the different geometrical terminologies, in particular concerning the nature of the views, refer to the reference frame formed by the head.

First, this delimbing head comprises, in a manner known per se, a body 1 or frame, represented in a schematic partial way. This body 1 supports different knives, commonly intended to clasp and delimb the trunk T of a tree, only one of which 5 is illustrated in this FIG. 1. Each knife comprises an arm 10 and a blade 20, which will be detailed in the following.

The arm 10 is hinged on the body 1, about an axis A10 substantially parallel to the longitudinal axis of the trunk, in service. Each arm supports a blade 20, which will be described in more detail in the following, which blade allows separating a branch B with respect to the aforementioned trunk T.

Figure 2:
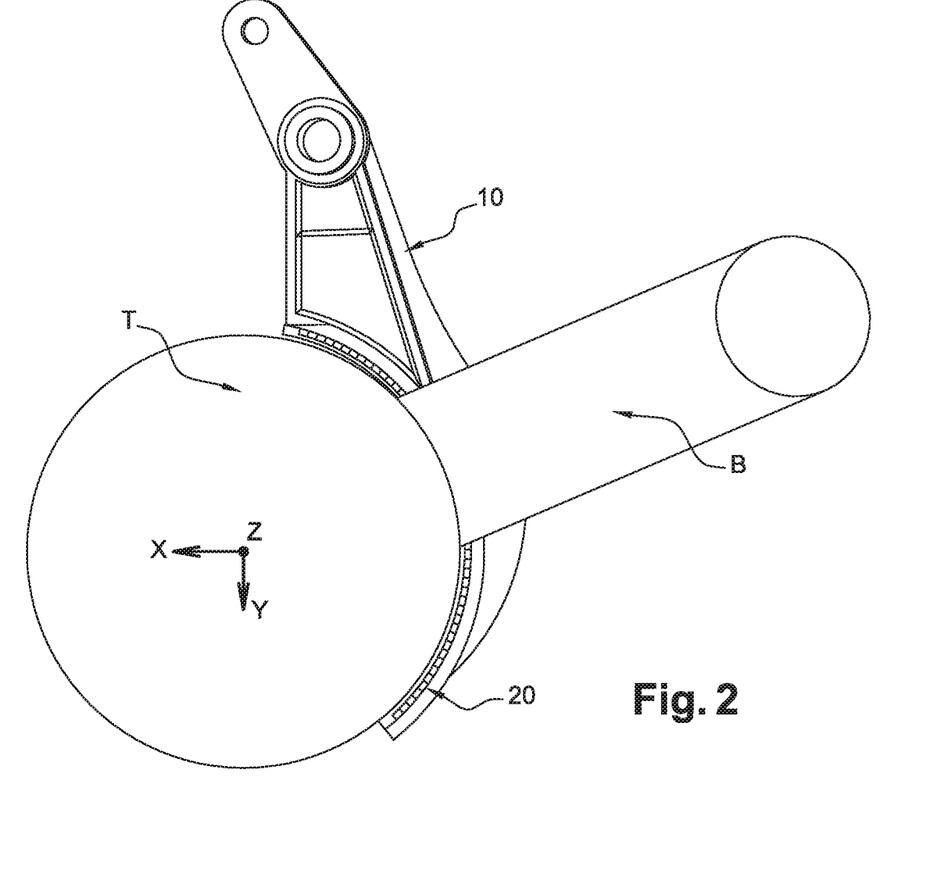
FIG. 2 is a front view illustrating, according to another angle, the delimbing head of FIG. 1.

In FIGS. 1 and 2, the orthogonal reference frame XYZ is shown, with the Z axis corresponding to the main direction of the trunk T. The blade is viewed from the front, in particular in FIGS. 4 and 6, according to the Z axis. It is viewed from the top, in particular in FIGS. 5 and 7, according to the X axis.

Figures 3, 4, 5:
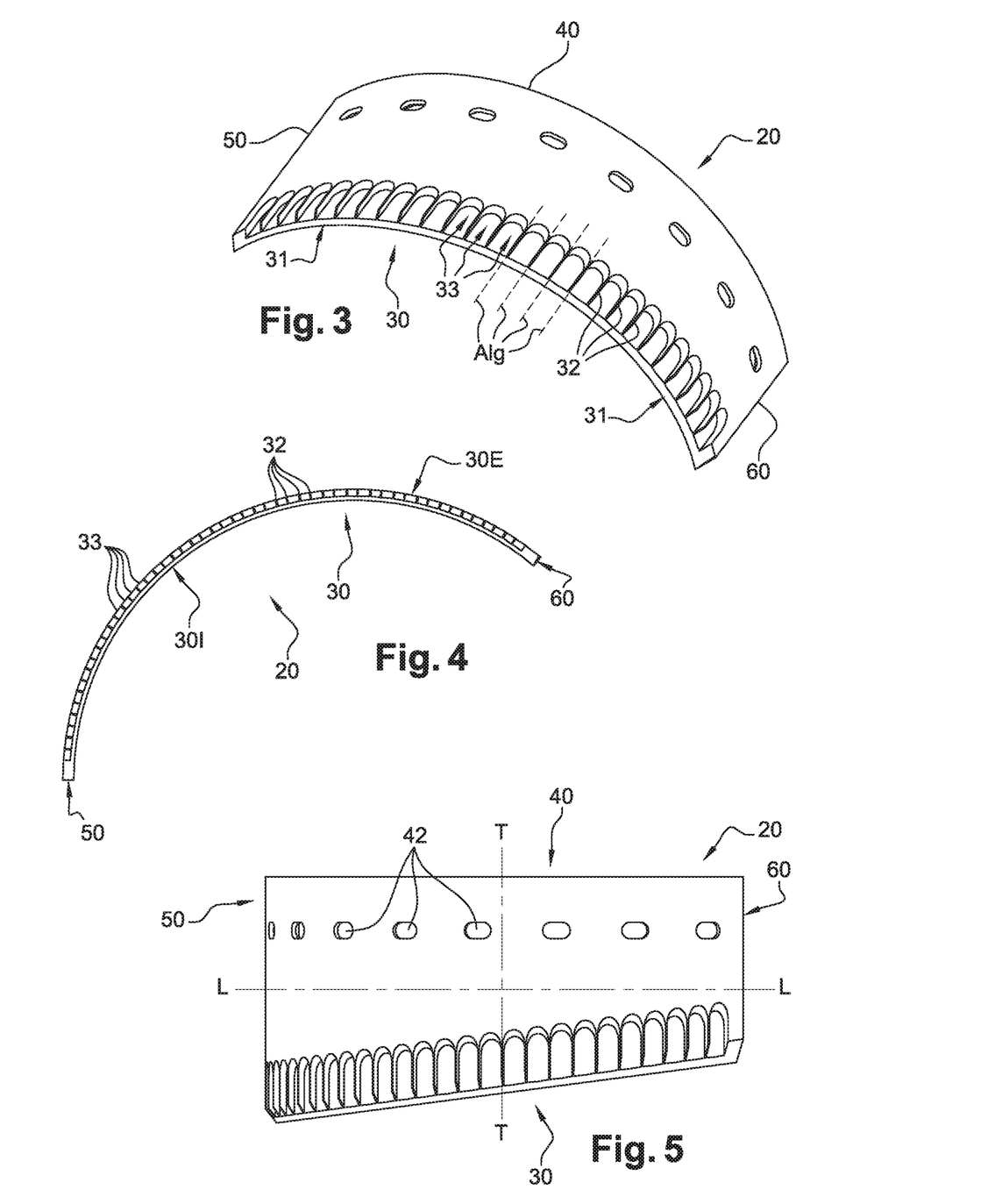
FIG. 3 is a perspective view illustrating more specifically a curved blade belonging to the knife of FIG. 1.
FIG. 4 is a front view illustrating the blade of FIG. 3.
FIG. 5 is a top view illustrating the blade of FIG. 3.

Referring in particular to FIG. 5, note the cutting rim 30 of the blade 20, which will be described in more detail in the following. Furthermore, note its fastening rim 40 on the arm 10. In the illustrated example, this rim 40 is dug by different orifices 42, allowing the passage of fastening means which are not represented. This fastening may be removable or permanent.

Alternatively, the blade and the arm may also form a single-piece assembly. A portion of the blade may also have a greater thickness than the rest of this blade. For example, referring to this FIG. 5, the blade may be thicker in the vicinity of its fastening rim 40.

Finally, note the lateral rims 50 and 60 of the blade 20, one 50 of which is called proximal rim as it is adjacent to the hinge axis of the arm, and the other is called terminal rim. The length of the blade is considered with reference to the longitudinal axis LL linking these two lateral rims 50 and 60, and the width of the blade is considered with reference to the transverse axis TT linking the two other rims 30 and 40.

The blade in accordance with the invention is called curved blade in the sense that it is not straight when viewed from the front, namely according to the Z axis. In other terms, it has a concavity similar to the concavity of the arm 10 supporting it, this concavity being directed towards the trunk of the tree, when the blade is adjacent to this trunk. The blade in accordance with the invention may be continuously curved, by having for example a circle arc-shaped profile. In the main embodiment, illustrated in FIGS. 1 to 9, the radius of curvature of the blade is substantially constant over the entire length of the latter.

However, as a variant illustrated in FIG. 10, the value of this curvature may be variable along the blade 120. Thus, are arranged, successively from the proximal rim 150, a straight portion 121, a portion 122 with a small radius of curvature, a portion 123 with an intermediate radius of curvature and finally a portion 124 with a large radius of curvature. The presence of these different portions allow the blade to ensure a tighter and more accurate contact with trunks of different diameters, and therefore to limit the heights of residual branches after cutting.

As a variant which is not represented, the blade in accordance with the invention may be constituted of several straight blade sections, when viewed from the front. In other words, this blade is polygonal. After having been made separately, these sections are fastened together, for example by welding, so as to define a curvature within the meaning of the invention.

Referring in particular to FIGS. 3 to 9, the cutting rim 30 will now be described in more detail. Note the inner face 301 of this cutting rim 30, namely the one adjacent to the trunk, when in service, and its opposite outer face 30E.

The cutting rim 30 is ribbed over a portion of its height, so that it is composed of a continuous flange 31 (see in particular FIGS. 7 to 9), as well as a series of ribs 32, which are separated by indentations 33. This flange 31 is called continuous flange, namely that it is not interrupted by indentations. It defines a continuous cutting edge A31, chamfered with respect to the main straight line DI of the cutting rim.

Moreover, each rib 32 defines a free edge A32, or leading edge, which is also chamfered. As will be described in more detail in the following, the chamfer angles of the edge A31 and of each edge A32 are advantageously identical, buy may alternatively be different. Furthermore, note the regions 35 delimited by the bottom of these indentations, which are parallel to the opposite faces 301 and 30E.

In the main embodiment of FIGS. 1 to 9, there is provided a single row of ribs. The latter extend in the direction of the outer face 30E of the cutting rim, from the flange 31. The latter defines a portion of the inner face 301, whereas the tip of the ribs defines a portion of said outer face 30E.

Furthermore, in this example, the free edge of each rib lies in the extension of the cutting edge. In other words, the base A32' of each edge A32 coincides with the end A31' of the edge A31, opposite to the inner face 301. This is illustrated in particular in FIG. 9, which is a section along a face of the rib (see the section line IX-IX in FIG. 7).

Figure 7:
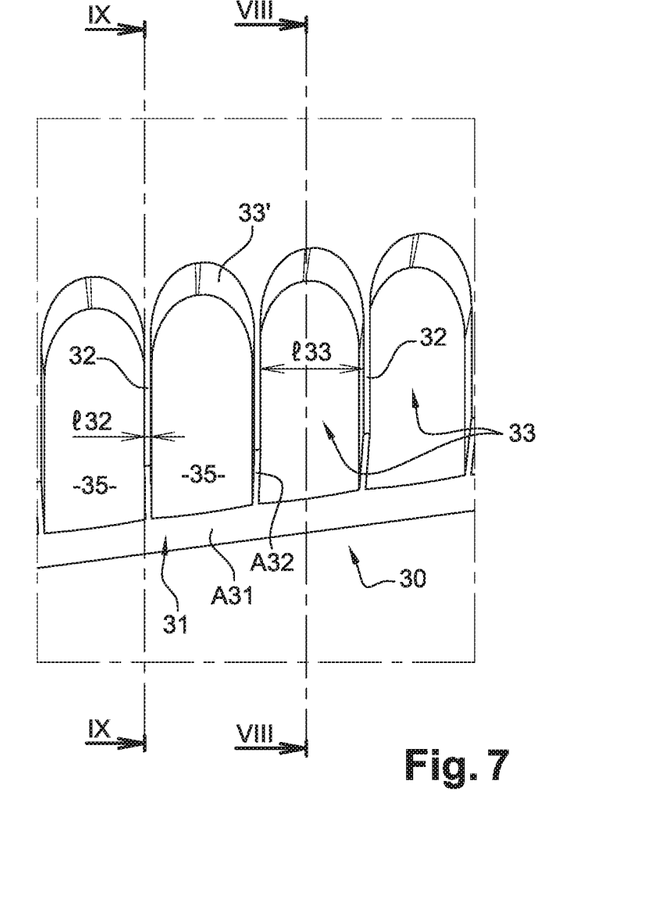
FIG. 7 is a top view illustrating, on a larger scale, a portion of the blade shown in FIG. 5.
Figure 8:
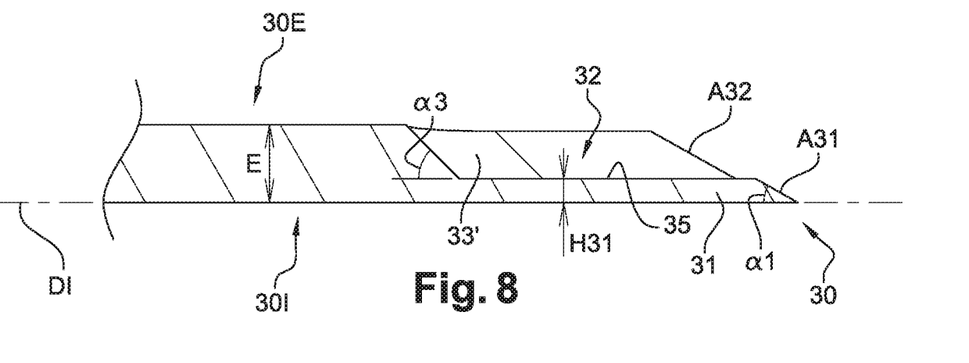
FIG. 8 is a sectional view according to the arrows VIII-VIII in FIG. 7.
Figure 9:
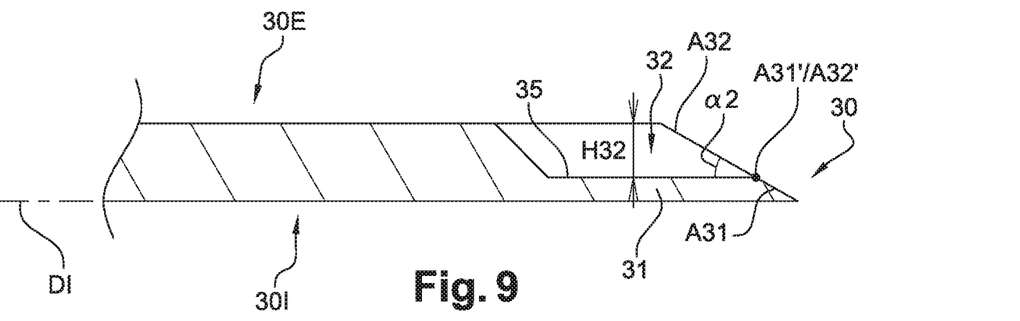
FIG. 9 is a sectional view according to the arrows IX-IX in FIG. 7.

It will be noted that, in FIG. 8, there is an offset between the edges A31 and A32. This is only due to the fact that the free end of the cutting rim, located in the lower part of FIG. 7, is not perpendicular to the section line VIII-VIII, according to which this FIG. 8 is taken.

This cutting rim 30 is ribbed over a substantial portion of its length. The length of the ribbed area corresponds to the length between the opposite walls of the two extreme indentations. In the case where several ribbed sections separated by non-ribbed sections are provided, this length of the ribbed area corresponds to the sum of the lengths of these sections.

Advantageously, the length of the ribbed area is greater than 50% of the total length of the cutting rim. This cutting rim may be not ribbed over its entire length, in particular in the vicinity of at least one of its ends, in particular in the case where the considered end is not a cutting area, but for example an overlapping area with another knife.

As shown in particular in FIG. 7, when viewed from the top, each rib 32 is rectangular with a rounded rim. Each indentation 33 also presents a generally rectangular shape when viewed from the top, with a circle-arc shaped rear wall 33'. As shown in FIG. 8, this wall advantageously has a chamfer angle $\alpha 3$ considered with respect to the main straight line DI of the inner face 301. This allows ensuring a discharge of matter, for the residual wood chips.

Figure 6:
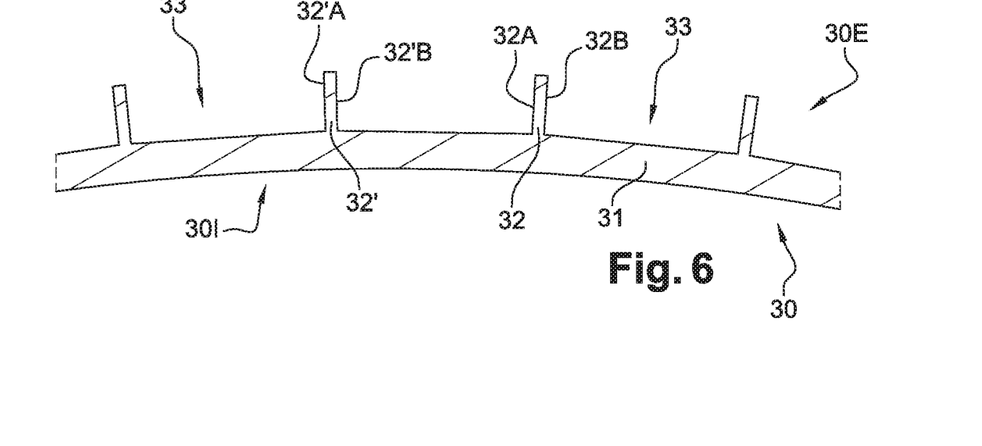
FIG. 6 is a front view illustrating, on a larger scale, a portion of the blade shown in FIG. 4.

In addition, referring to FIG. 6, note the lateral walls 32A and 32B of a given rib 32, as well as the lateral walls 32'A and 32'B of the rib 32' adjacent thereto. In this example, the planes of the different lateral walls 32A, 32B, 32'A and 32'B are substantially parallel to the forward direction, which is in turn substantially parallel to the Z axis.

In all cases, regardless of the number, implantation and/or configuration of the ribs, the longitudinal axes Alg of the ribs are straight and parallel to each other, only some of these axes being illustrated in FIG. 3 for more clarity.

Such a configuration of the longitudinal axes Alg of the ribs, and de facto, such a similar arrangement of the ribs, allows optimizing the effectiveness of the ribs by reducing the cutting force while reinforcing the mechanical resistance of the blade.

Figure 11:
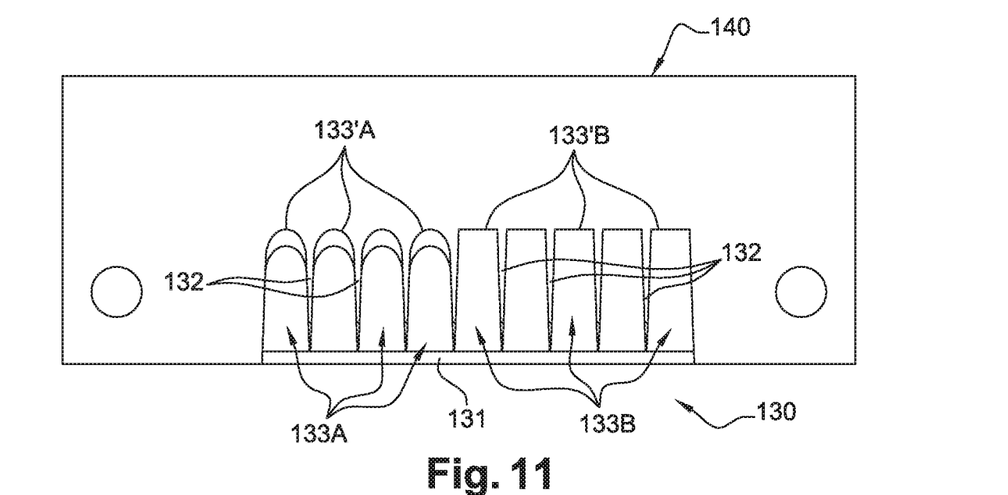
FIG. 11 is a top view, similar to FIG. 7, illustrating other shapes of ribs of the blade of the invention.

In a variant represented in FIG. 11, each rib 132 may be flared, namely, its width increases rearwards, that is to say, in the direction of the fastening rim 140. In other words, this rib is then trapezoidal, with a width increasing to the top of this figure. In another embodiment, the width of each rib is variable between its base and its free end. In other words, each rib, in the cross-section, is triangular. Alternatively, it is conceivable that the ribs are trapezoidal and have a triangular cross-section at the same time. Under these conditions, the ribs act in a «wedge»-like manner when they come into contact with the wood fibers. This allows these ribs to pass easily between the wood fibers. This being said, for these trapezoidal ribs and/or ribs with a triangular cross-section, their longitudinal axes are also straight and parallel to each other.

As shown to the left of this FIG. 11, the rear wall 133'A of the indentations 133A may be rounded. Alternatively, as shown to the right of this figure, the rear wall 133'B of the indentations 133B may be straight.

When in service, as shown in FIG. 1, the tree is set in motion by means of the drive means, not represented, according to the arrow F which is substantially parallel to the Z axis. The cutting edge A31 then comes into contact with the branch B to be cut, thereby causing it loading. At the same time, the ribs prevent the lateral load of this continuous edge, which is subjected to the aforementioned stress. Hence, it is possible to size the flange 31 and, consequently, this edge A31 so as to minimize their contact surface with the tree, while guaranteeing their mechanical strength.

The following numerical values, related to the different mechanical elements of the cutting rim, are given for indication hereinafter:
- thickness or height H31 of the flange 31 (see FIG. 8): between 1 and 10 mm (millimeters). This range of thicknesses is advantageous, as it allows a reduced cutting force.
- thickness or height H32 of the ribs 32 (see FIG. 9), from the region 35: between 3 and 15 mm (millimeters). This range of thicknesses is advantageous, as it allows increasing the mechanical resistance of the entire blade. In particular, bending of the continuous edge of small-thickness is limited, or even avoided. Those skilled in the art will be able to adjust the value of this thickness, in particular depending on the species of the tree and on the diameter of the branch to be cut. Advantageously, the height H32 is greater than the height H31, the ratio H32/H31 being for example comprised between 1.5 and 3.
- transverse dimension, or width 132 of the ribs (see FIG. 7), at their free end: smaller than 5 mm
- transverse dimension, or width 133 of the indentations 33 (see FIG. 7), between the free end of two adjacent ribs 32: between 5 and 50 mm.

These ranges of widths, related to the ribs and to the indentations, are advantageous. Indeed, they allow the ribs to interpose between the wood fibers, without inducing crushing of the latter, which would be prejudicial. Furthermore, these values are appropriate for most wood species, often encountered during the use of the delimbing heads.
- chamfer angle α1 of the edge A31 (see FIG. 8), considered with respect to the straight line DI: between 15 and 45°, preferably close to 30°.
- chamfer angle α2 of the each edge A32 (see FIG. 9), considered with respect to the straight line DI: between 15 and 45°, preferably close to 30°. For example, the values of α1 and α2 are equal.
- radius of curvature of the rear wall 33' of each indentation: close to half the width of the indentations, namely (133/2). This allows obtaining a half-circle shape.
- total width E of the blade (see FIG. 8): between 5 and 25 mm.

Figure 12:
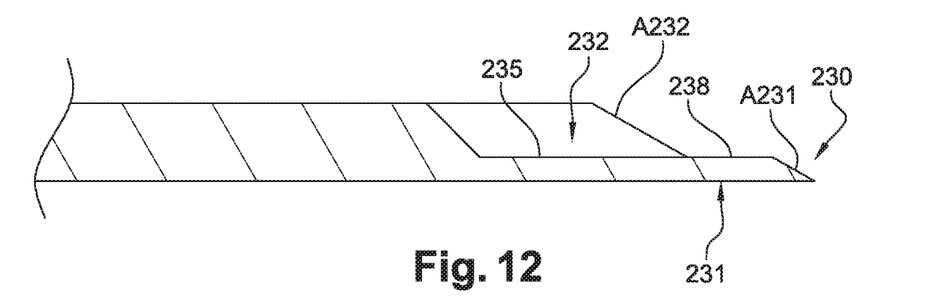
FIG. 12 is a sectional view, similar to FIG. 9, illustrating a blade provided with a flat portion, according to another variant of the invention.

FIG. 12 illustrates a variant of the invention, wherein the flange 231 protrudes forwards, beyond the free end of the ribs 232 and the regions 235 delimited by the indentations. This FIG. 12 is similar to FIG. 9, that is to say, it consists of a section along a face of a rib.

The flange 231 defines a chamfered cutting edge A231, as well as a flat portion 238 extending at the same altitude as the regions. Hence, in this embodiment, the edges A232 of the ribs 232 shall not prolong the edge A231, unlike what is illustrated in particular in FIG. 9. Among other things, this flat portion 238 can act as a visual wear indicator.

Advantageously, the curved blade of the invention is manufactured from an initial straight and non-ribbed blade. Afterwards, this straight blade is bent, so that it takes on the desired curvatures of the final blade, and then it is ribbed according to any appropriate method. Alternatively, it is possible to plan to rib a straight base blade, before bending it.

Figure 13:
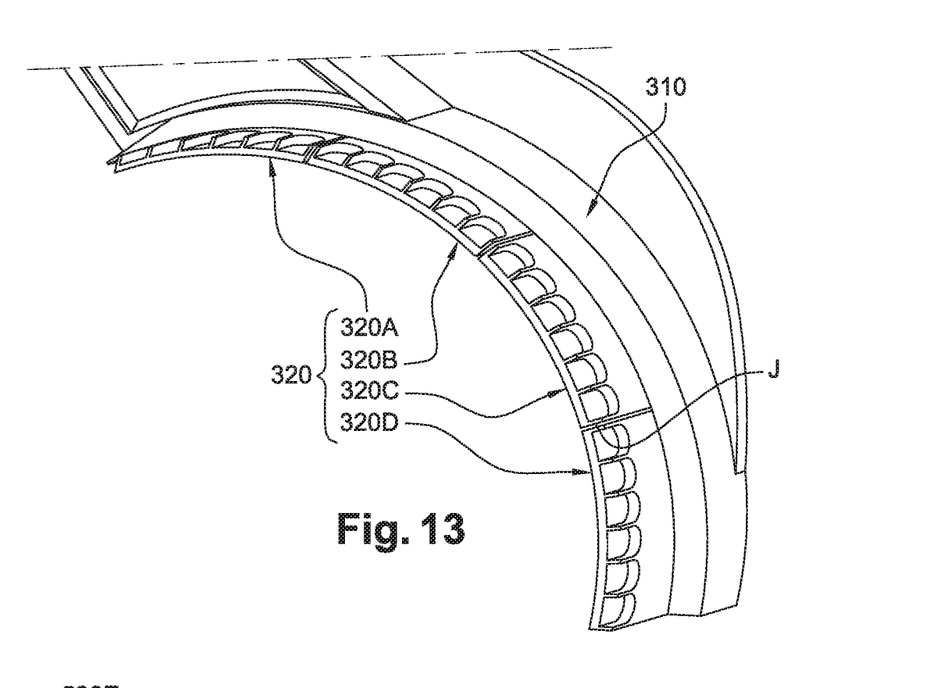
FIG. 13 is a perspective view illustrating a blade formed by several sections, still according to another variant of the invention.

In an additional variant, illustrated in FIG. 13, it is possible to provide a blade 320 formed by several sections 320A to 320D. The blade then forms a complete tool, composed of these different sections. The latter are fastened on the arm, in a removable or permanent manner, by any appropriate means.

These sections may present a curvature identical to the curvature of the arm 310 which supports them, but they may present a different curvature, or even that they are straight. In the case where they do not present the same curvature as the arm 310, these sections are slightly deformed while being fastened on this arm.

The removable-type fastening is advantageous. Under these conditions, it is possible to replace a single section of the blade, rather than the whole of it, in particular in the case where the considered section has been damaged or has undergone a more considerable wear than the other sections.

In the example illustrated in this FIG. 13, the sides of two adjacent sections are distant from each other, separated by a clearance J. In a variant which is not represented, two adjacent sections may overlap each other, for example in a tile-like manner. The cutting rim presents then a continuous nature, when viewed from the front.

Figure 14:
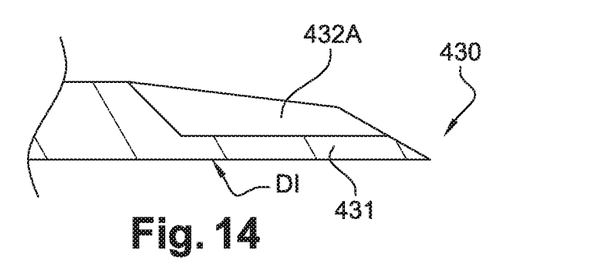
FIGS. 14 and 15 are sectional views, similar to FIG. 9, illustrating further shapes of ribs of the blade of the invention.
Figure 15:
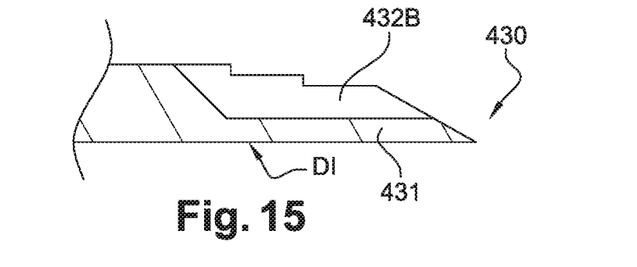

In the examples illustrated with reference to FIGS. 1 to 13, the tip of the ribs is parallel to the main straight line DI of the cutting rim. Alternatively, as shown in FIG. 14, the tip of the ribs 432A may be inclined with respect to this straight line DI. In an additional variant, as shown in FIG. 15, the tip of the ribs 432B may present a notched or stepped profile.

In the examples illustrated with reference to FIGS. 1 to 15, there is provided a single row of ribs, extending from the flange towards the outer face of the cutting rim. In a variant illustrated in FIG. 16, there may be provided two rows of ribs 532A and 532B. In this case, these rows extend on either side of the continuous flange 531, towards the opposite faces 530E and 530I.

In this case, the edge A531, defined by this flange 531, presents a V-shape, the peak of which is turned towards the branch to be cut. The free edges of each row of ribs prolong this edge A531, in the direction defined with reference to FIG. 9. In this manner, the entire cutting rim is generally symmetrical with respect to a midplane P, which extends horizontally in this FIG. 16.

The tip of the ribs of the first row defines a portion of the outer face 530E of the cutting rim 530, whereas the tip of the ribs of the second row defines a portion of its outer face 530I. When viewed from the front, the ribs of both rows may be aligned, as in the example of FIG. 16. Alternatively, these ribs may be disposed in a staggered manner.

The cutting blade in accordance with the invention may be made of several different materials. Thus, each area of the blade is constituted of an adapted material, depending on the stresses it will undergo. For example, a portion of the blade, in particular its cutting rim, may be hardened by means of an adapted coating, of a type known per se.

Moreover, each rib may be constituted of an appropriate material. In this respect, the ribs may be made independently from the blade body, and then attached by any appropriate method, for example by welding.

In additional variants which are not represented, the blade of the invention may be fitted with at least one visual wear indicator.

This indicator may be formed by a longitudinal groove, formed on the outer face 30E, proximate to the free end of the continuous edge 31. It may also be formed by an aperture, linking the opposite faces of the blade, proximate to this free end. This indicator may also be constituted by an aperture formed in the rib itself.

In other embodiments of the blade which are not represented, the width of the blade is not constant over its entire length. In other words, the cutting edge is continuous but not straight. Such an edge presents at least one relief, namely a recess or a bump, or even several identical or different reliefs. In such embodiments, the cutting edge has a more or less toothed aspect. In other embodiments, the body of the blade itself is undulated, the undulations being, or not, evenly disposed and identical. It is conceivable that in these embodiments, a toothed edge and an undulated blade body, may be combined in the same blade, on the understanding that, in all cases, the blade is provided with ribs the longitudinal axes of which are straight and parallel to each other. Such configurations facilitate the cutting for the branches with a larger section and/or of a hard wood.

Figure 16:
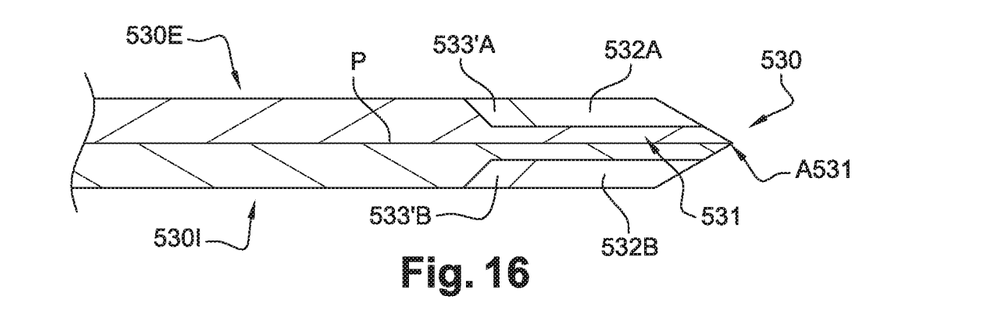
FIG. 16 is a sectional view, similar to FIG. 8, illustrating a blade comprising two rows of ribs, still according to another variant of the invention.
Figure 17:
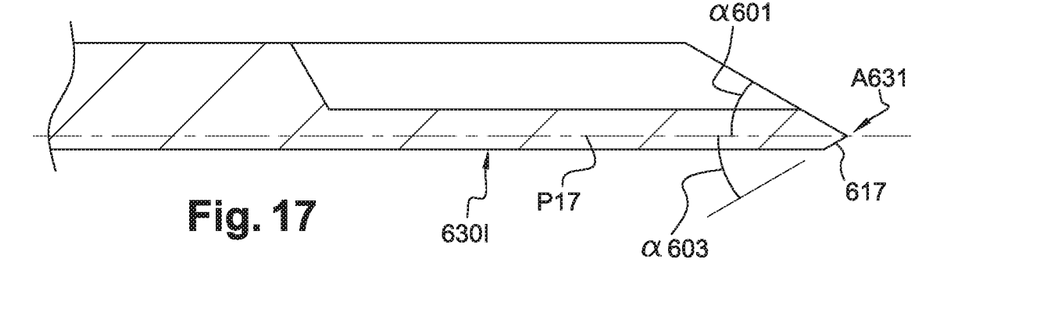
FIGS. 17 to 19 are sectional views, similar to FIG. 16, of other embodiments of the invention.
Figure 18:
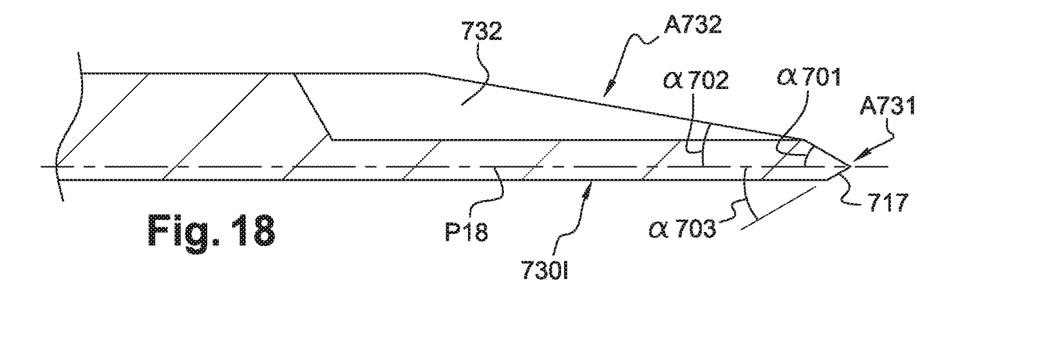
Figure 19:
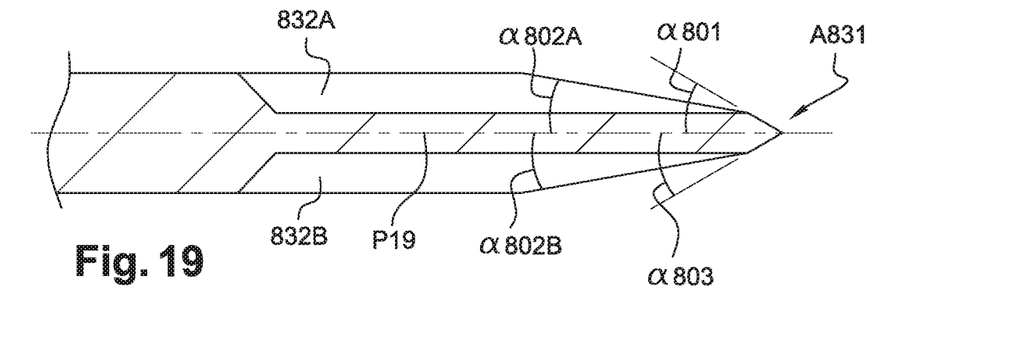

In the embodiments illustrated in FIGS. 17 to 19, the cutting edges, respectively, A631, A731 and A831 are configured in a V-shape, in the same manner as the cutting edge A531 of FIG. 16. The inner faces 6301, 7301 of the blades of the embodiments of FIGS. 17 and 18 are planar and devoid of ribs. In other words, they are similar to those illustrated in FIGS. 8, 9, 14 and 15. The V-shape of such cutting edges allows defining an undercut which facilitates the displacement of the blade not only during the cutting operation but advantageously also during its release. Indeed, the presence of a chamfer on each face of the blade acts as a separator at the level of the wood fibers and facilitates the removal of the blade while avoiding jamming of the latter between the wood fibers.

Note that, in FIG. 18, the angle α701 between the edge A731 and an average plane P18 of the blade and the angle α702 between the edge A732 of the rib 732 and the plane P18 are different. In this instance, the angle α702 is smaller than the angle α701. Such a configuration facilitates the penetration of the blade, the separation of the fibers under the action of the ribs being then performed over a longer distance.

Herein, in FIGS. 17 and 18, the angle α603, α703 respectively between the inner chamfer 617 or 717 and an average plane P17, P18 of the blade is identical to the angle α601, α701. Alternatively, these angles α603, α703 and/or α601, α701 are different.

FIG. 19 illustrates an embodiment with ribs 832A and 832B disposed on both faces of the blade, and therefore an embodiment similar to the embodiment illustrated in FIG. 16. Herein, the angles α802A and α802B, with respect to an average plane P19, respectively of the ribs 832A and 832B, are identical. The angles α802A and α802B are smaller than the angles α801 and α803 of the chamfers 816 and 817, with respect to the plane P19, of the peak A831. Alternatively, these angles α801 and α803 and/or α802A and α802B are different.

The invention claimed is:

1. A curved blade (20; 120; 320) for a delimbing head operable to cut branches from a felled tree, intended to be mounted on an arm (10; 310) of the head, said blade comprising a cutting rim (30; 130; 230; 330; 430; 530) having an inner face (301; 5301), the inner face being adjacent to a trunk of a felled tree during operation of the delimbing head, and an outer face (30E; 530E), the blade further having a curvature over a length of the blade when viewed from the front of the blade,
wherein at least one portion of the cutting rim comprises a continuous flange (31; 131; 231; 431; 531) defining a continuous cutting edge (A31; A231; A531; A631; A731; A831), as well as at least one row having a plurality of ribs (32; 132; 232; 432A; 432B; 532A; 532B; 732; 832A, 832B), a longitudinal axis (Alg) of each rib of the plurality of ribs (32; 132; 232; 432A; 432B; 532A; 532B; 732; 832A, 832B) being straight and parallel to each other rib of the plurality of ribs and extending in a direction along at least one face (301, 30E) of the cutting rim toward the continuous flange, wherein each rib of the plurality of ribs (32; 132; 432A, 432B; 532A, 532B; 732; 832A; 832B) defines a leading edge (A32), and wherein the continuous cutting edge (A31) and each leading edge (A32) have identical chamfer angles (α1, α2) with respect to a main straight line (DI) of the inner face, each rib of the plurality of ribs further having a trapezoidal profile and having a transverse triangular cross-section, wherein a ratio (H32/H31) of rib height (H32) to flange height (H31) is between 1.5 and 3, and
wherein the at least one row having a plurality of ribs is positioned adjacent to the continuous cutting edge such that each rib is configured to reduce a cutting force needed by the curved blade to cut through the branches when the leading edge of the rib comes into contact with the branches of the felled tree.

2. The blade according to claim 1, wherein the chamfer angles (α1, α2) are between 15° and 45° with respect to the straight line (DI).

3. The blade according to claim 1, wherein each leading edge (A232) of each rib of the plurality of ribs is separated from the continuous cutting edge (A231) by a flat portion (238).

4. The blade according to claim 1, wherein there is provided a single row of ribs (32; 132; 232; 432A, 432B; 732), which extends along said outer face (30E) of the cutting rim (30; 130; 230; 330; 430).

5. The blade according to claim 1, wherein there are provided two rows of ribs (532A, 532B; 832A, 832B), with one row of the two rows of ribs extending along the outer (530E) face and another row of the two rows of ribs extending along the inner (5301) face of the cutting rim (530).

6. A delimbing head comprising a frame (1), at least two arms (10; 310) hinged on the frame suitable for grabbing a trunk of a tree, and a curved blade (20; 120; 320) fastened on each of the at least two arms suitable for cutting branches of the tree, wherein at least one curved blade is according to claim 1.

7. The delimbing head according to claim 6, wherein at least one curved blade (320) is composed of several sections (320A-320D) removably fastened on the arm (310), each section being deformed while being fastened on the arm.

8. A cutting kit comprising at least two curved blades according to claim 1, wherein at least one parameter feature selected from the group consisting of a length of the cutting rim, dimensions of the continuous flange, dimensions of the ribs, and constituent material is different between the at least two blades.

9. The delimbing head according to claim 6, wherein each curved blade is according to claim 1.

* * * * *